US010694659B2

(12) United States Patent
Sauder et al.

(10) Patent No.: US 10,694,659 B2
(45) Date of Patent: Jun. 30, 2020

(54) AGRICULTURAL INPUT SELECTION SYSTEMS, METHODS AND APPARATUS

(71) Applicant: Precision Planting LLC, Tremont, IL (US)

(72) Inventors: Derek Sauder, Tremont, IL (US); Todd Swanson, Morton, IL (US); Troy Plattner, Goodfield, IL (US)

(73) Assignee: Precision Planting LLC, Tremont, IL (US)

( * ) Notice: Subject to any disclaimer, the term of this patent is extended or adjusted under 35 U.S.C. 154(b) by 191 days.

(21) Appl. No.: 15/985,063

(22) Filed: May 21, 2018

(65) Prior Publication Data

US 2018/0263175 A1    Sep. 20, 2018

Related U.S. Application Data

(62) Division of application No. 14/762,459, filed as application No. PCT/US2014/012363 on Jan. 21, 2014, now Pat. No. 9,974,230.

(60) Provisional application No. 61/754,944, filed on Jan. 21, 2013.

(51) Int. Cl.
| A01C 7/10 | (2006.01) |
| A01C 7/12 | (2006.01) |
| A01C 7/04 | (2006.01) |
| A01C 21/00 | (2006.01) |

(52) U.S. Cl.
CPC ............... *A01C 7/10* (2013.01); *A01C 7/046* (2013.01); *A01C 7/12* (2013.01); *A01C 21/005* (2013.01)

(58) Field of Classification Search
CPC .... A01C 7/10; A01C 7/08; A01C 7/00; A01C 7/046; A01C 7/044; A01C 7/042; A01C 7/04; A01C 7/12; A01C 21/005; A01C 21/00
See application file for complete search history.

(56) References Cited

U.S. PATENT DOCUMENTS

| 4,023,509 A | 5/1977 | Hanson |
| 5,915,313 A | 6/1999 | Bender et al. |
| 6,070,539 A | 6/2000 | Flamme et al. |
| 6,164,222 A | 12/2000 | Mayerle et al. |
| 6,516,733 B1 | 2/2003 | Sauder et al. |

(Continued)

FOREIGN PATENT DOCUMENTS

| EP | 2931017 A1 | 10/2015 |
| EP | 2934079 A1 | 10/2015 |

(Continued)

OTHER PUBLICATIONS

International Search Report and Written Opinion; International Bureau; PCT Application No. PCT/US2014/012363; dated May 16, 2014; 13 pages.

(Continued)

*Primary Examiner* — Christopher J. Novosad

(57) ABSTRACT

Systems, methods and apparatus for selecting an agricultural input. First and second inputs are in communication with a seed meter. A selection apparatus constrains the seed meter to deposit only one of the input sources such that the seed meter alternates between depositing the first and second inputs. Processing circuitry controls the selection apparatus to alternate between the first and second inputs.

10 Claims, 17 Drawing Sheets

(56) References Cited

U.S. PATENT DOCUMENTS

| | | |
|---|---|---|
| 6,626,120 B2 | 9/2003 | Bogner et al. |
| 7,418,908 B2 | 9/2008 | Landphair et al. |
| 7,938,075 B1 | 5/2011 | Glendenning et al. |
| 8,948,980 B2 | 2/2015 | Garner et al. |
| 9,974,230 B2 * | 5/2018 | Sauder .................. A01C 7/046 |
| 2006/0278726 A1 | 12/2006 | Holly |
| 2007/0048434 A1 | 3/2007 | Mayerle et al. |
| 2011/0098851 A1 | 4/2011 | Glendenning et al. |
| 2011/0178632 A1 | 7/2011 | Straeter |
| 2014/0165889 A1 | 6/2014 | Garner et al. |
| 2014/0165890 A1 | 6/2014 | Graham |
| 2015/0319916 A1 | 11/2015 | Garner et al. |

FOREIGN PATENT DOCUMENTS

| | | |
|---|---|---|
| WO | 2012129442 A3 | 9/2012 |
| WO | 2014100796 A1 | 6/2014 |

OTHER PUBLICATIONS

Extended European Search Report; European Patent Office; EP Application No. 14740635.9; dated Oct. 11, 2016; 16 pages.
Extended European Search Report; European Patent Office; EP Application No. 18185269.0, dated Oct. 11, 2018; 12 pages.

\* cited by examiner

AGRICULTURAL INPUT SELECTION SYSTEMS, METHODS AND APPARATUS

BACKGROUND

In recent years, the ability to control crop input applications on a site-specific basis (known as "precision farming") has increased interest in varying input types throughout a field. In particular, advances in seed genetics and agronomic research have increased the need for solutions enabling the variation of seed types in the field during a planting operation. Prior proposed solutions such as those disclosed in U.S. Pat. No. 8,543,238 require multiple meters at each row unit and are relatively slow to transition between seed types. Other proposed solutions involve shifting between input types fed to the metering units, which results in blending of input types at the metering units and thus blended input regions in the field. Preferred solutions would quickly transition between input types with limited blending between seed types.

Thus there is a need in the art for systems, methods and apparatus for effectively selecting and varying agricultural input types during an in-field operation.

DESCRIPTION

Figure 1:
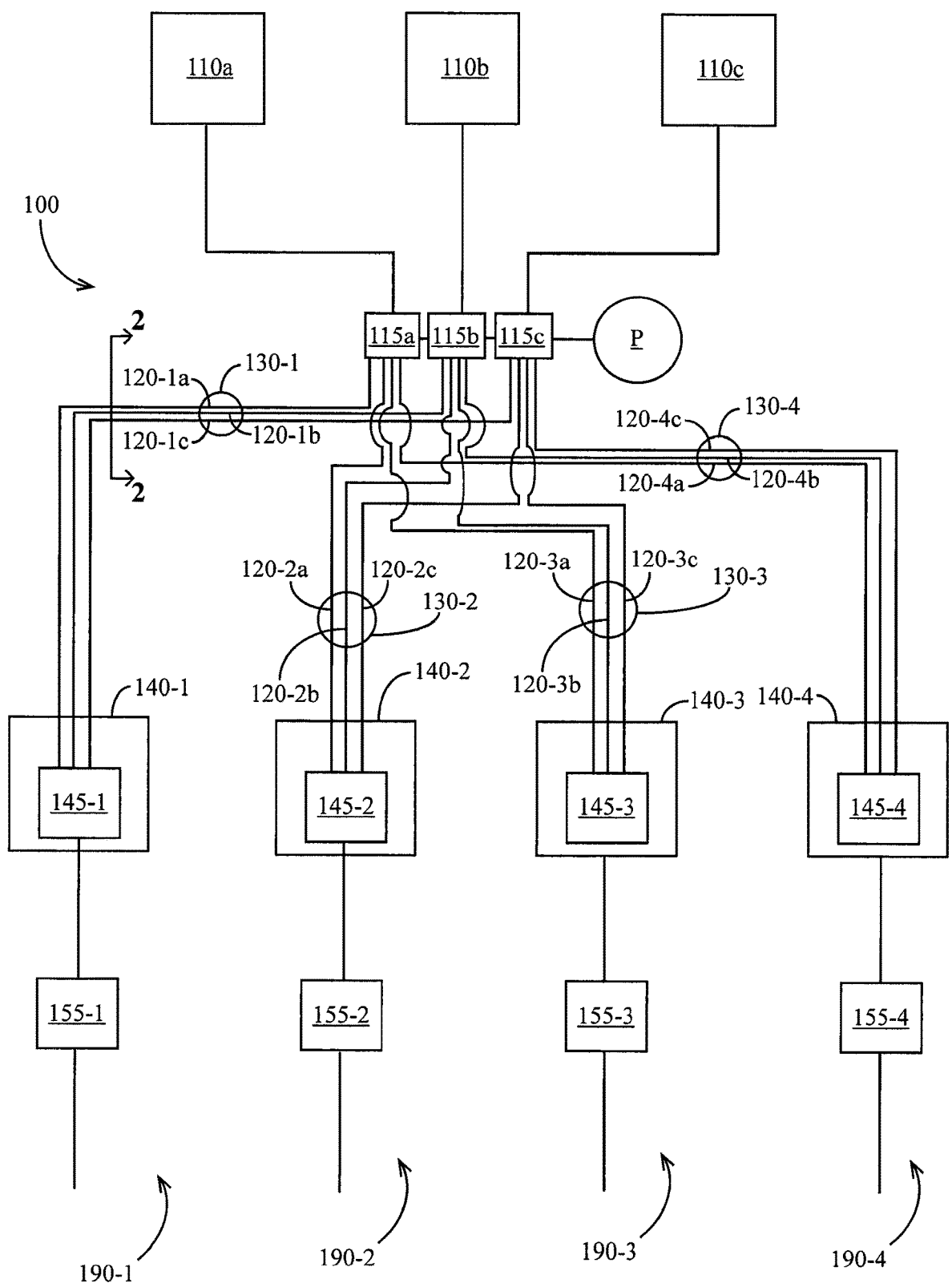
FIG. 1 schematically illustrates an embodiment of an agricultural input selection system.

Referring now to the drawings, wherein like reference numerals designate identical or corresponding parts throughout the several views, FIG. 1 schematically illustrates a variety selection system 100. The variety selection system 100 is preferably mounted to a pneumatic seed delivery planter similar to that disclosed in U.S. Pat. No. 7,779,770, the disclosure of which is incorporated herein by reference, which planter is preferably drawn through the field by a tractor (not shown).

Variety Selection Systems

The variety selection system 100 preferably includes segregated bulk seed hoppers 110a, 110b, 110c, which are preferably supported by a toolbar of the planter or a cart drawn behind the planter. Each bulk seed hopper 110 is preferably in fluid communication with an associated entrainer 115. Each entrainer 115 is preferably in fluid communication with a blower or other pressure source P and is configured to distribute seeds received pneumatically from the bulk seed hoppers to a plurality of row units 190 via a plurality of pneumatic lines 120.

The entrainers 115 and pneumatic lines 120 are preferably configured to evenly distribute seeds between the row units 190. After the seeds pass through each line 120, seeds pass through a seed meter 140, which may comprise a seed meter such as that disclosed in Applicant's co-pending International Patent Application No. PCT/US2012/030192, the disclosure of which is hereby incorporated herein in its entirety by reference. Each seed meter 140 preferably includes a seed pool 145 (see also FIG. 5) where seeds gather after being delivered to the meter 140. A seed disc 141 (FIG. 5) captures seeds from near the bottom of the seed pool 145 and deposits the seeds into a seed tube or seed conveyor. After entering the seed tube or conveyor, the seeds then pass by a seed sensor 155 (FIG. 1), which is preferably mounted to a seed tube of the row unit and which may comprise either an optical sensor or an electromagnetic sensor. After passing the seed sensor 155, the seeds are deposited into a trench opened by the row unit.

Figure 13:
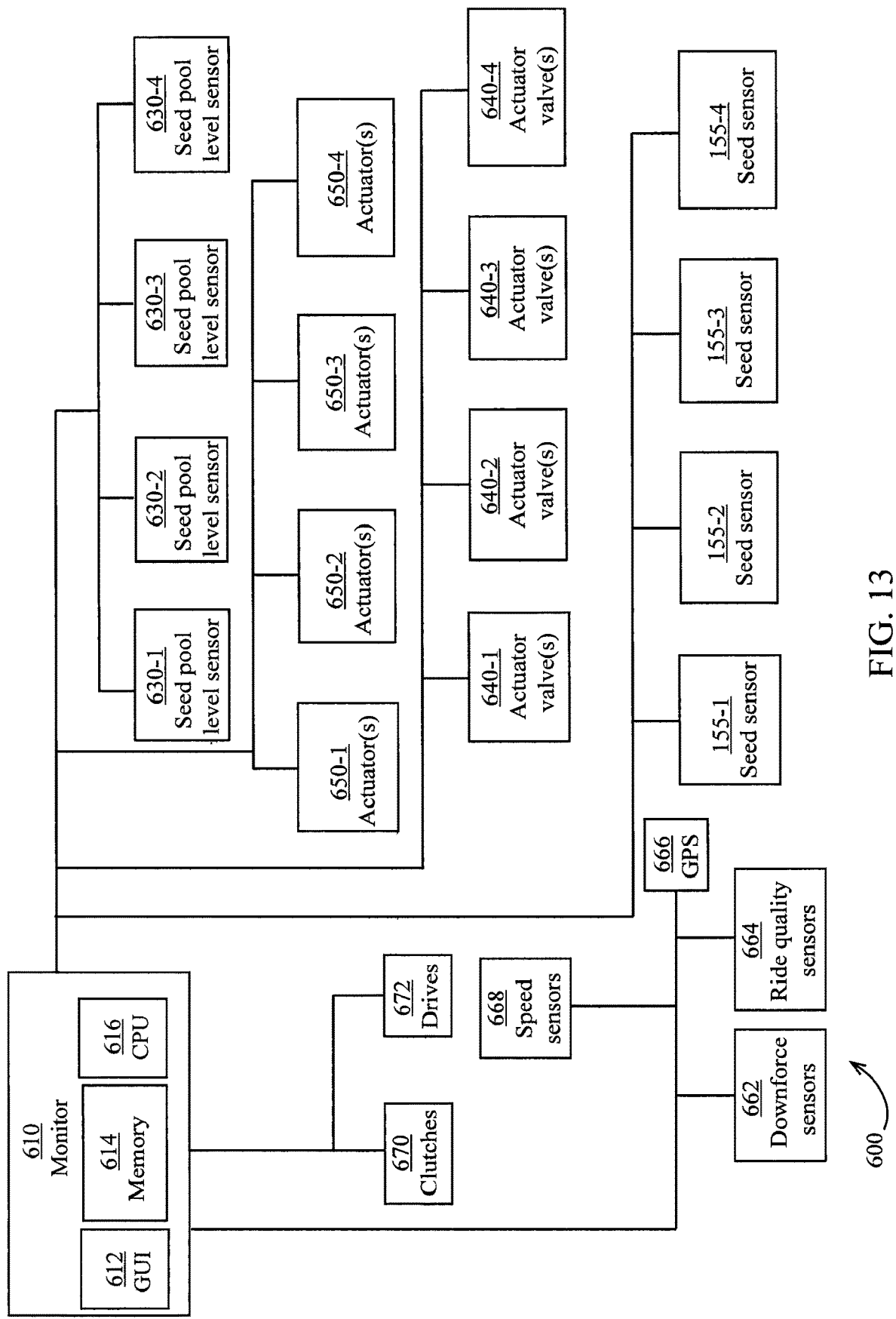
FIG. 13 schematically illustrates an embodiment of an electrical system for selecting seed varieties.

Turning to FIG. 13, an electrical system 600 for controlling the variety switch is illustrated schematically. The electrical system 600 preferably includes a monitor 610 having a graphical user interface 612, a memory 614 and a CPU 616. The monitor 610 is preferably in electrical communication with the seed sensors 155 of the variety selection system 100. The monitor 610 is preferably also in electrical communication with a global positioning ("GPS") receiver 666 preferably mounted to the tractor and one or more speed sensors 668 preferably mounted to the tractor or the planter. The monitor 610 is preferably also in electrical communication with row clutches 670 and seed meter drives 672 configured to individually control each seed meter 140 or a group of seed meters. The monitor 610 is also preferably in electrical communication with an array of downforce sensors 662 (e.g., strain gauges) configured to measure the downforce applied to individual row units of the planter and an array of ride quality sensors 664 (e.g., accelerometers) configured to generate a signal related to the ride quality of individual row units of the planter.

The monitor 610 is preferably in electrical communication with a seed pool level sensor 630 associated with each seed pool 145 at each row unit 190. The monitor 610 is preferably in electrical communication with one or more seed pool actuators 650 associated with each seed pool 145 at each row unit 190. In other embodiments, the monitor 610 is in electrical communication with a valve 640 configured to open or close an associated seed pool actuator 650. Each valve 640 is preferably in fluid communication with a pressurized fluid source (e.g., an air compressor). In some embodiments described herein, the seed pool actuators 650 comprise actuators configured to close and open seed pool doors. In other embodiments, each seed pool actuator 650 comprises a servo motor configured to modify the position of a seed pool gate disposed at the end of a pneumatic line. In other embodiments, each seed pool actuator comprises a servo motor configured to modify the position of a seed pool at each row unit 190. In other embodiments, each seed pool actuator comprises a solenoid configured to modify a position of a deflector key.

Pneumatic Line Apparatus

As illustrated in FIG. 1, a set of three pneumatic lines 120 (e.g., lines 120-1a, 120-1b, 120-1c) in fluid communication with each of the three bulk seed hoppers 110a, 110b, 110c preferably form a single segregated line 130 (e.g., segregated line 130-1) extending from the entrainers 115 to one of the row units 190 (e.g., row unit 190-1).

Figure 2:
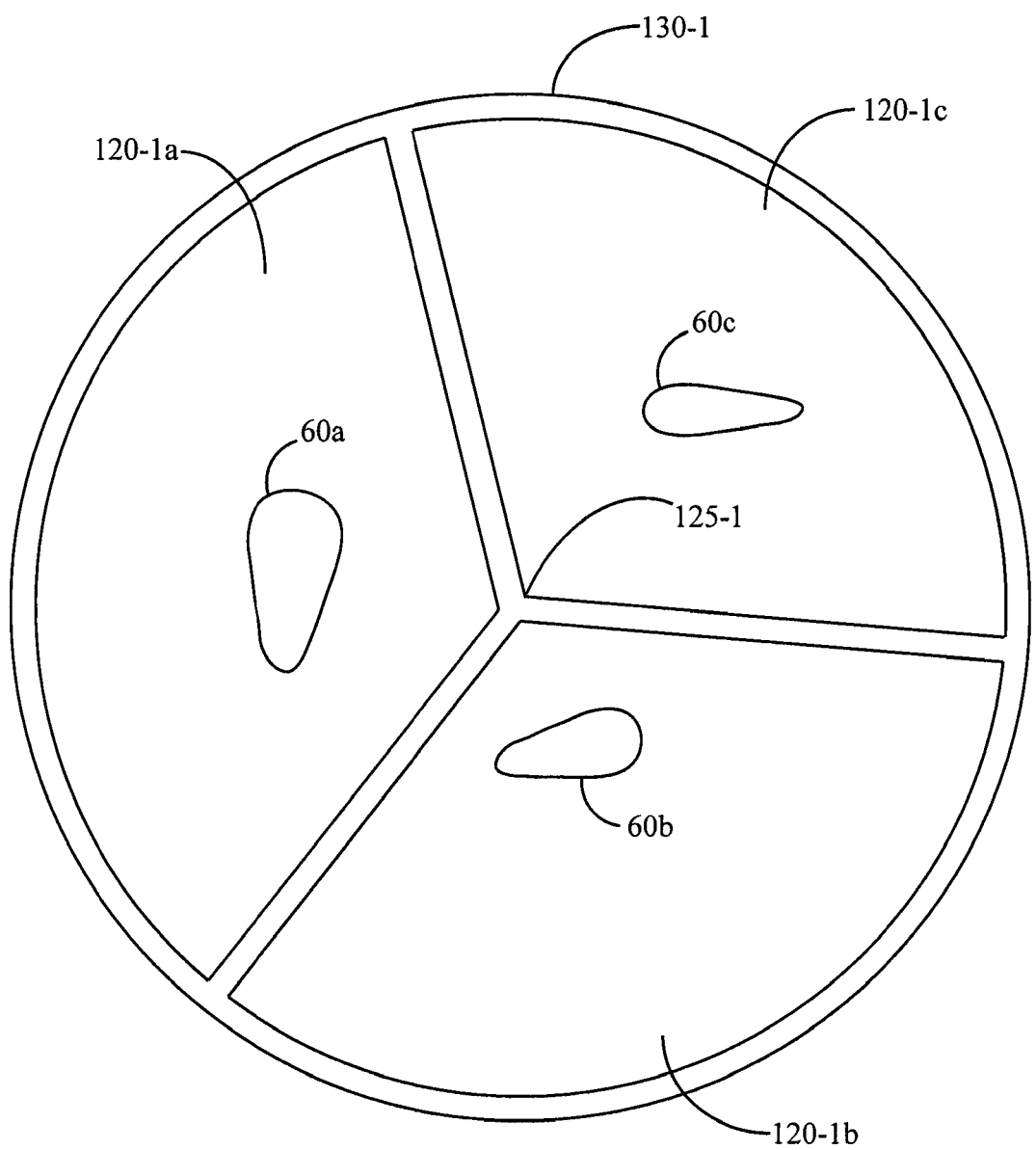
FIG. 2 illustrates a cross-section of an embodiment of a segregated pneumatic line as viewed along line 2-2 of FIG. 1.

A first embodiment of the segregated line 130 is illustrated in FIG. 2, which is a cross-sectional view of the pneumatic line 120 as viewed along line 2-2 of FIG. 1. Each pneumatic line 120 preferably comprises a segregated, longitudinally extending inner volume of the segregated line 130. Each pneumatic line 120 is preferably segregated from the other pneumatic lines by a partition 125. In the embodiment if FIG. 2, the partition 125 forms radially symmetrical lines 120-1a, 120-1b, 120-1c within the segregated line 130. Seeds 60 travel through lines 120 in fluid communication with an associated bulk seed hopper 110 (e.g., seeds 60a from seed hopper 110a are travel through line 120-1a within the segregated line 130-1).

Figure 3:
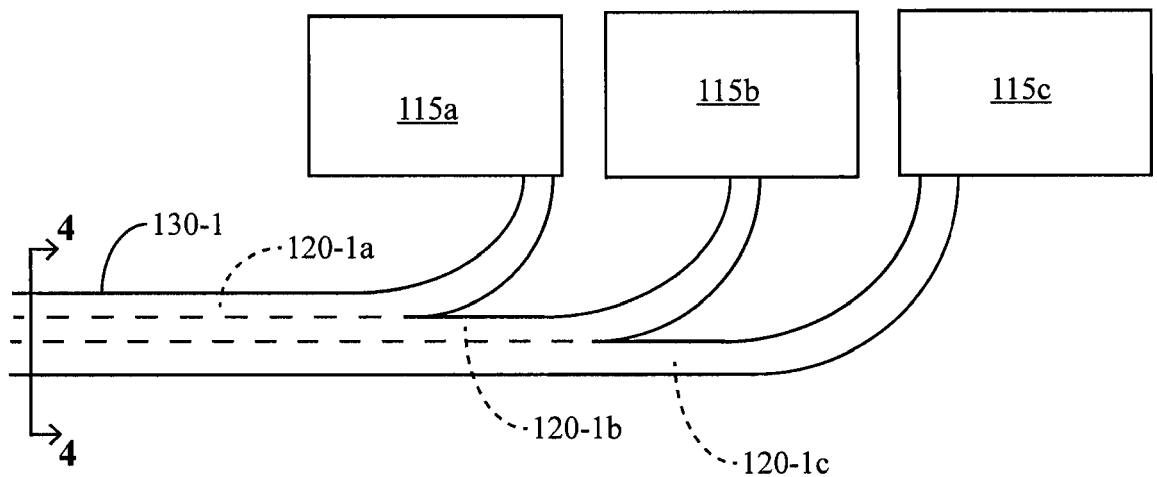
FIG. 3 illustrates a portion of an embodiment of another embodiment of a segregated pneumatic line.
Figure 4:
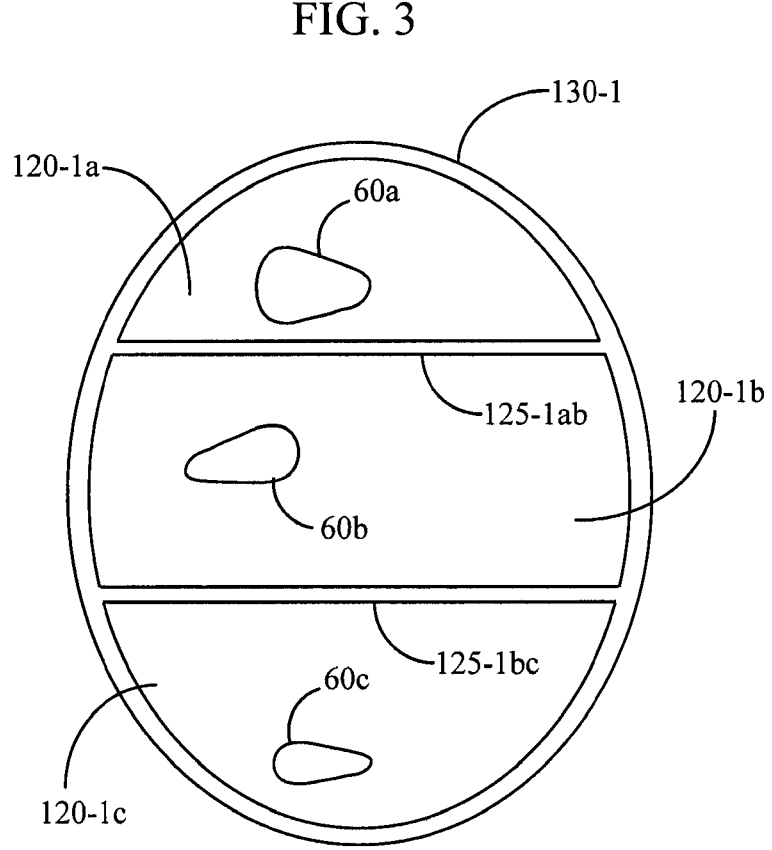
FIG. 4 illustrates the segregated pneumatic line as viewed along line 4-4 of FIG. 3.

A second embodiment of the segregated line 130 is illustrated in the side view of FIG. 3 and in FIG. 4 which is a cross-sectional view of FIG. 3 as viewed along lines 4-4 of FIG. 3. As with the first embodiment, each pneumatic line 120 preferably comprises a segregated longitudinally extending inner volume of the segregated line 130. Each pneumatic line 120 is preferably segregated from the other pneumatic lines by a partition 125 (e.g., the pneumatic lines 120-1a, 120-1b are separated by the partition 125-1ab and the pneumatic lines 120-1b, 120-1c are separated by the partition 125-1bc). Seeds 60 travel through lines 120 in fluid communication with an associated bulk seed hopper 110 (e.g., seeds 60a from seed hopper 110a are travel through line 120-1a within the segregated line 130-1).

Variety Selection Apparatus

As described above, the electrical system 600 preferably includes an actuator 650 or set of actuators 650 or actuator valves 640 configured to selectively place one of the pneumatic lines 120 in seed communication with the seed meter 140.

Figure 5:
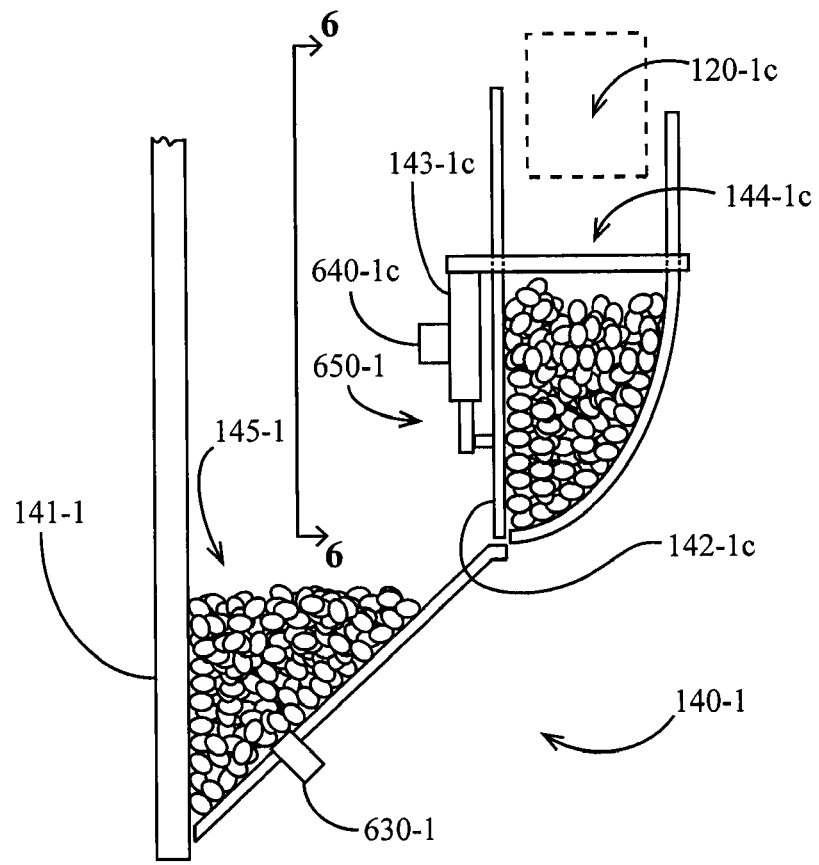
FIG. 5 illustrates a cross-sectional view of an embodiment of a seed meter having three segregated seed pools and a central seed pool.
Figure 6:
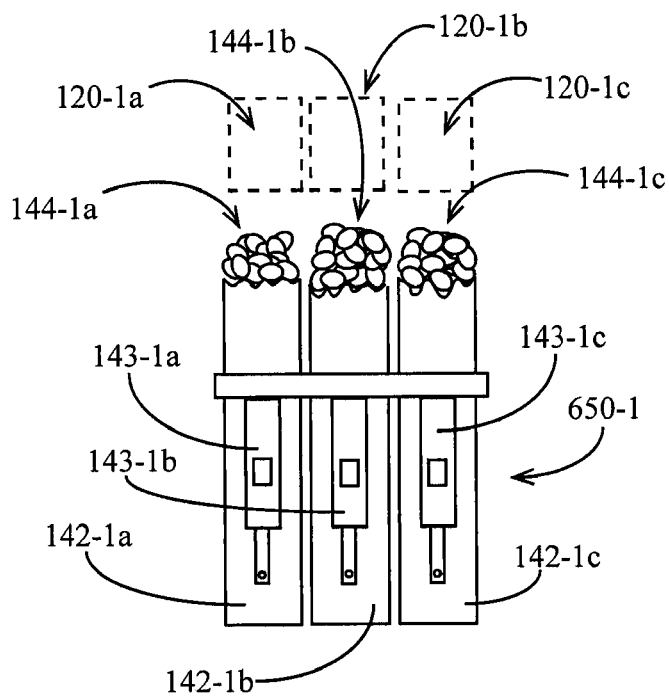
FIG. 6 illustrates an expanded partial view of the seed meter embodiment as viewed along line 6-6 of FIG. 5.

Referring to the embodiment of FIG. 5 and as shown in FIG. 6, which schematically illustrates a partial cross-sectional view as viewed along lines 6-6 of FIG. 5, each pneumatic line 120 is in fluid communication with a segregated seed pool 144 (e.g., the pneumatic line 120-1a is in fluid communication with the segregated seed pool 144-1a). Each segregated seed pool 144 is separated from a central seed pool 145 by a gate 142. The set of actuators 650 comprises three actuators 143 configured to raise and lower the associated gates 142. Each actuator 143 preferably comprises a pneumatic actuator spring-loaded into a retracted position such that each gate 142 is normally open unless the associated actuator 143 is extended. A pneumatic solenoid-operated on-off valve 640 is preferably in fluid communication with each actuator 143. Each valve 640 is preferably in fluid communication with an air compressor supplying pressurized air to each valve 640. When one of the actuators (e.g., actuator 143-1b) is retracted to raise the associated gate (e.g., gate 142-1b), seeds are allowed to fall from the seed pool disposed behind the gate (e.g., seed pool 144-1b) into the central seed pool 145. Seeds from the seed pool 145 are entrained on seed-carrying apertures in a seed disc 141 adjacent to the seed pool 145. As the seed pool 145 empties, an optical sensor 630 disposed in a lower wall of the seed meter 140 is exposed to light (e.g., a light source inside the seed pool 145) such that the optical sensor generates a signal corresponding to an empty seed pool.

Figure 7A:
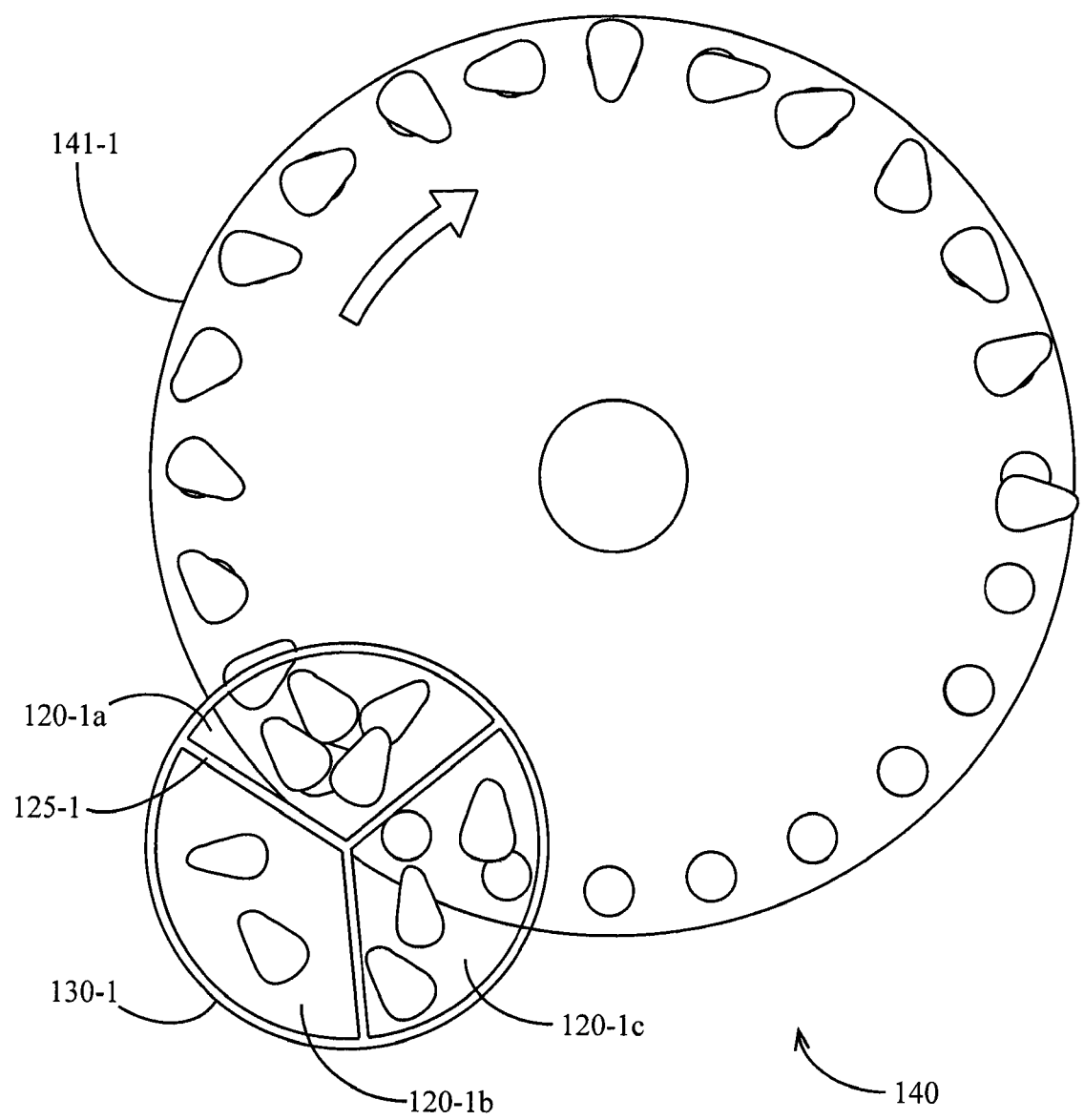
FIG. 7A is a partial side elevation view of another embodiment of seed in direct selective seed communication with a segregated pneumatic line.
Figure 7B:
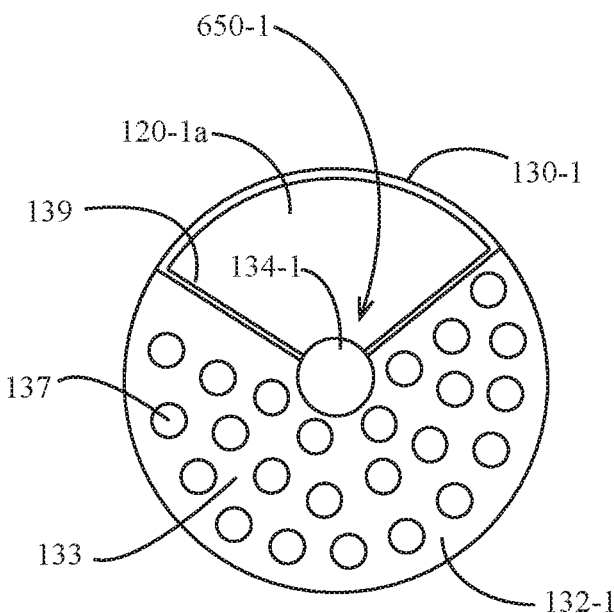
FIG. 7B is a side elevation view of the end of a segregated pneumatic line in seed communication with the seed meter embodiment of FIG. 7A.
Figure 7C:
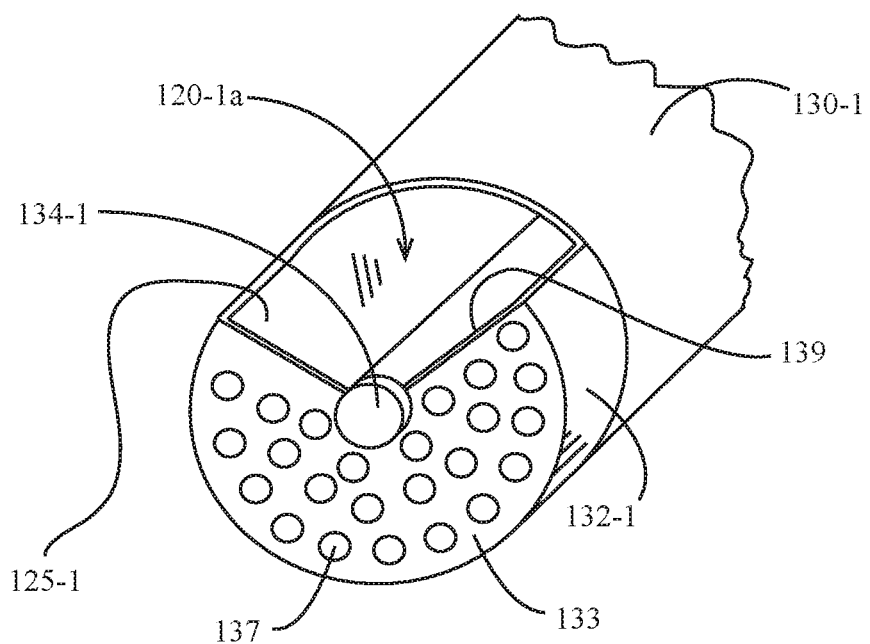
FIG. 7C is a perspective view of the end of a segregated pneumatic line in seed communication with the seed meter embodiment of FIG. 7A.

In the embodiment of FIGS. 7A through 7C illustrating different views of one of the pneumatic lines 120, a terminal portion of each pneumatic line 120 is selectively positioned adjacent the seed disc 141 to supply seed directly to the seed disc 141. A vented cap 132-1 (FIGS. 7B-7C) selectively covers two of the segregated lines such that seeds are retained in the end of the pneumatic lines that are not used to supply seed to the seed disc 141. The vented cap 132-1 comprises an end wall 133 having a plurality of apertures 137 therein and an opening 139. The actuator 650 comprises a servo motor 134 configured to rotate the partition 125 relative to the vented cap 132-1 and the seed disc 141 in order to supply seed from a different one of the segregated lines to the seed disc 141. For example, as the servo motor 134-1 rotates the partition 125-1 counterclockwise on the view of FIGS. 7B and 7C (or clockwise in the view of FIG. 7A), the line 120-1a rotates behind the vented cap 132-1 and the line 120-1b is exposed to the opening 139 in the vented cap 132-1 such that seeds are supplied from the line 120-1b to the seed disc 141-1.

Figure 8:
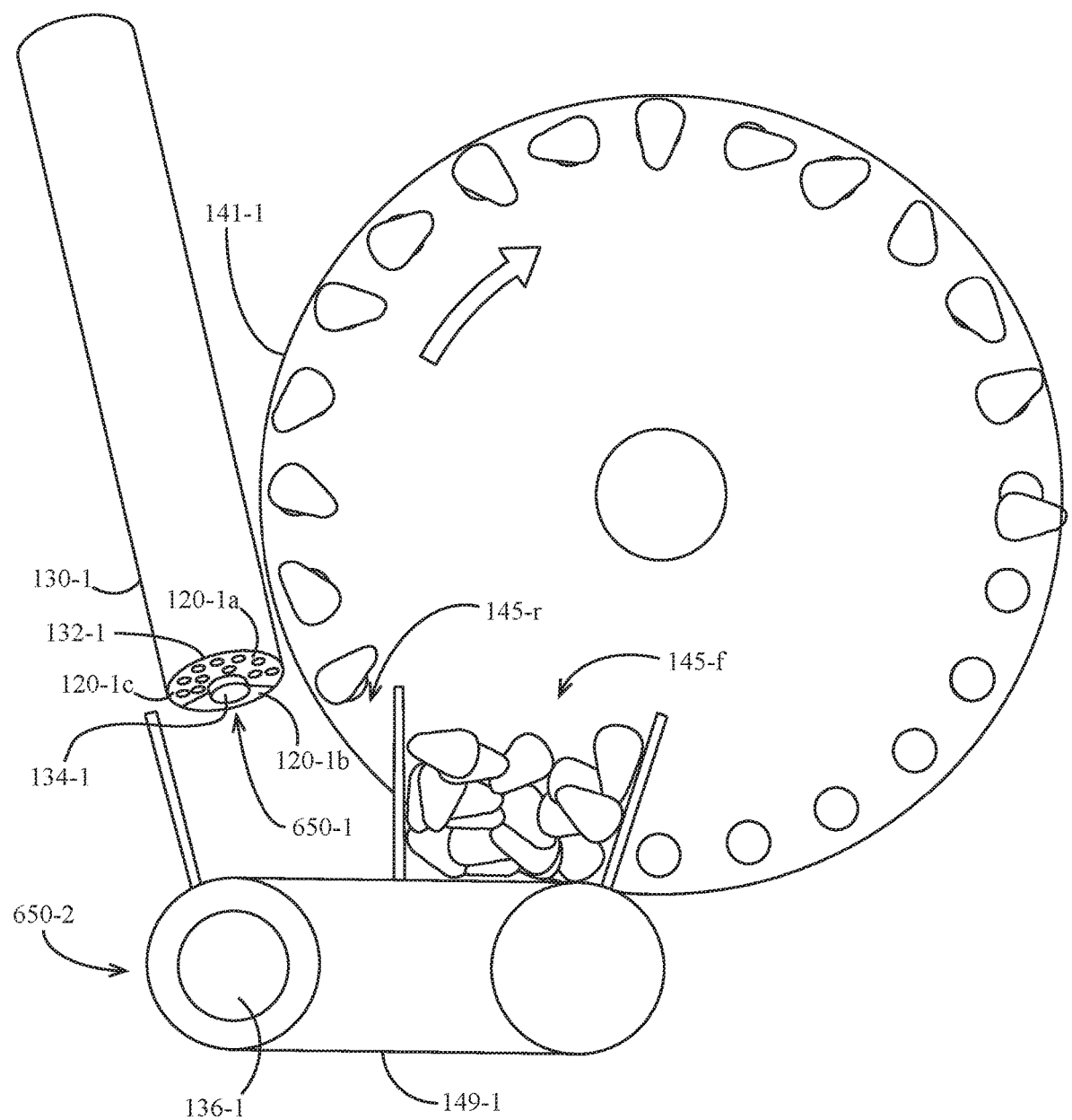
FIG. 8 is a side elevation view of an embodiment of a seed meter including a pair of shifting seed pools in selective seed communication with a pneumatic line and in selective seed communication with a seed disc.

In the embodiment of FIG. 8, the segregated line 130 terminates above a conveyor 149 having two seed pools 145-r, 145-f. A first actuator 650-1 preferably comprises a servo motor 134-1 configured to rotate a vented cap 132-1 relative to the terminal end of the segregated line 130 in order to selectively open one of the pneumatic lines 120 (e.g., in FIG. 8, the cap 132-1 is positioned to open the pneumatic line 120-1b). A second actuator 650-2 preferably comprises a servo motor 136-1 configured to adjust a position of the conveyor 149 in order to modify the position of the seed pools 145-r, 145-f relative to the seed disc 141-1. In a first position, the seed pool 145-f is positioned adjacent to the seed disc 141-1 to supply seed to the seed disc. In the first position, seeds supplied from the segregated line 130-1 are deposited into the seed pool 145-r. In a second position, the seed pool 145-r is positioned adjacent to the seed disc 141-1 to supply seed to the seed disc.

Figure 9:
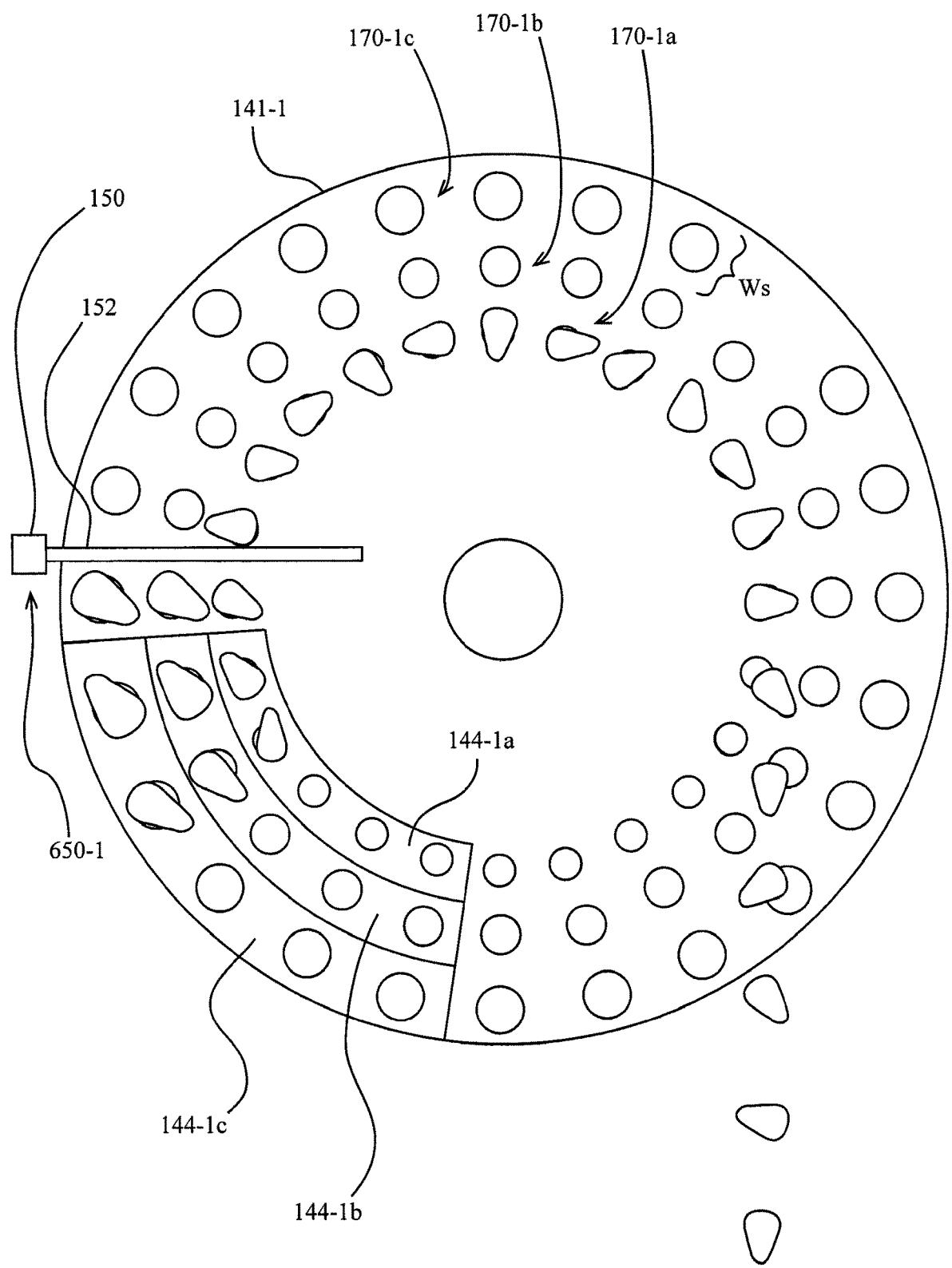
FIG. 9 is a side elevation view of an embodiment of a seed meter including multiple seed pools and a deflector key.
Figure 10:
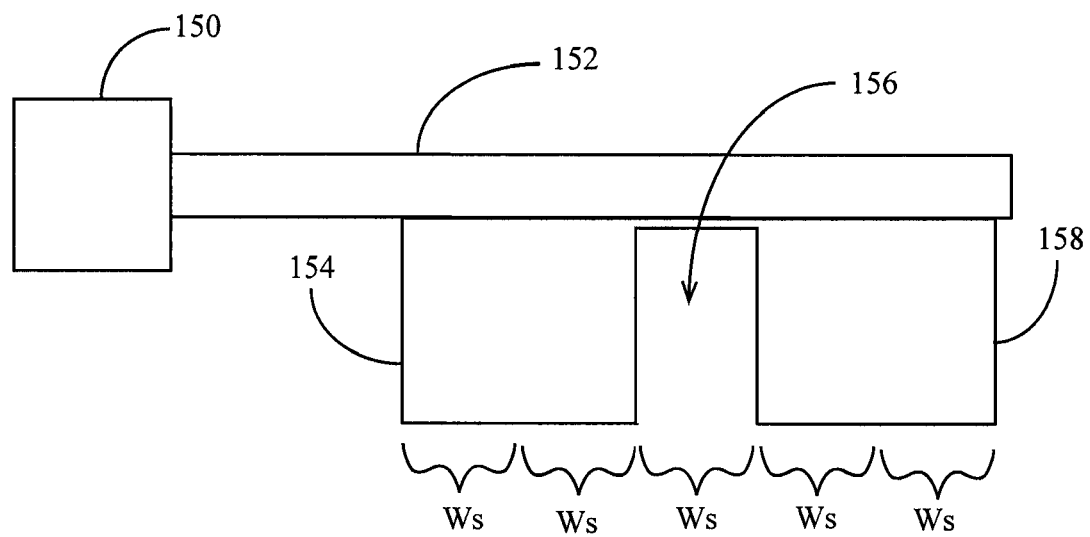
FIG. 10 a top plan view of the deflector key of FIG. 9.

In the embodiment of FIG. 9, three segregated seed pools 144 are in fluid communication with pneumatic lines 120 for receiving seed from the bulk seed hoppers 110 (e.g., seed pool 144-1c is in fluid communication with pneumatic line 120-1c). Each seed pool 145 is adjacent to and in seed communication with concentrically arranged seed aperture arrays 170 (e.g., the seed pool 144-1a is adjacent to and in seed communication with the seed aperture array 170-1c). An actuator 650 preferably comprises a linear actuator 150 configured to modify a position of a key 152. The key 152 is preferably configured to selectively deflect two of the three seed aperture arrays 170 such that seeds fall back into the seed pool 145 from which seeds are drawn by the associated aperture arrays 170. As illustrated in FIG. 10, the key 152 preferably includes two deflectors 154, 158 each having a width 2Ws (where Ws is the transverse width of each seed aperture array 170 as illustrated in FIG. 9) separated by an opening 156 having a width Ws. It should be appreciated that this configuration of the key 152 allows positioning of the key to selectively deflect seeds from any two of the three seed aperture arrays 170 while allowing seeds on the other seed aperture array to be transferred past the key 152 and deposited by the disc. For example, in FIG. 9 the deflector 154 deflects seeds from seed aperture arrays 170-1c and 170-1b into the seed pools 144-1c and 144-1b, respectively, while seeds are carried by seed aperture array 170-1a through the opening 156 and deposited by the disc 141.

Figure 12:
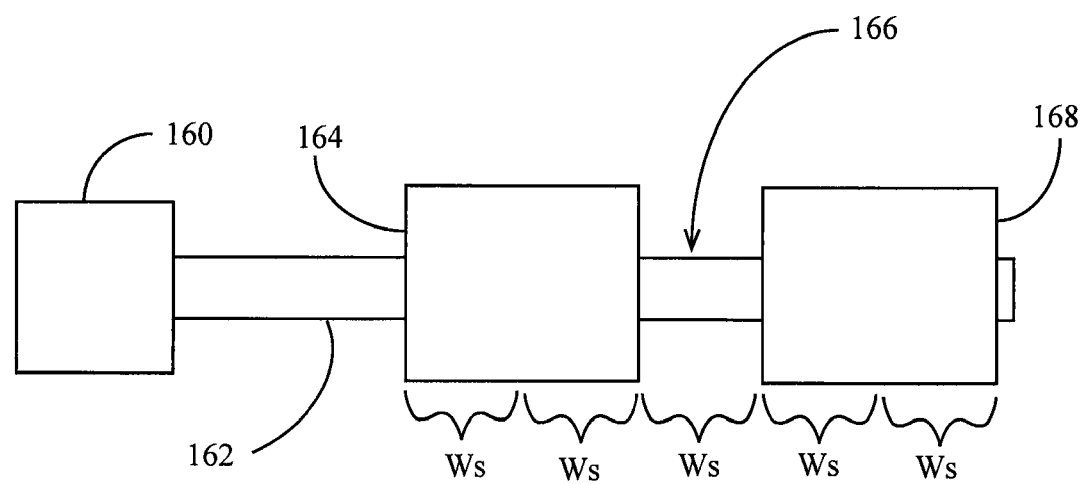
FIG. 12 is a top plan view of the vacuum cutoff roller key of FIG. 11.
Figure 11:
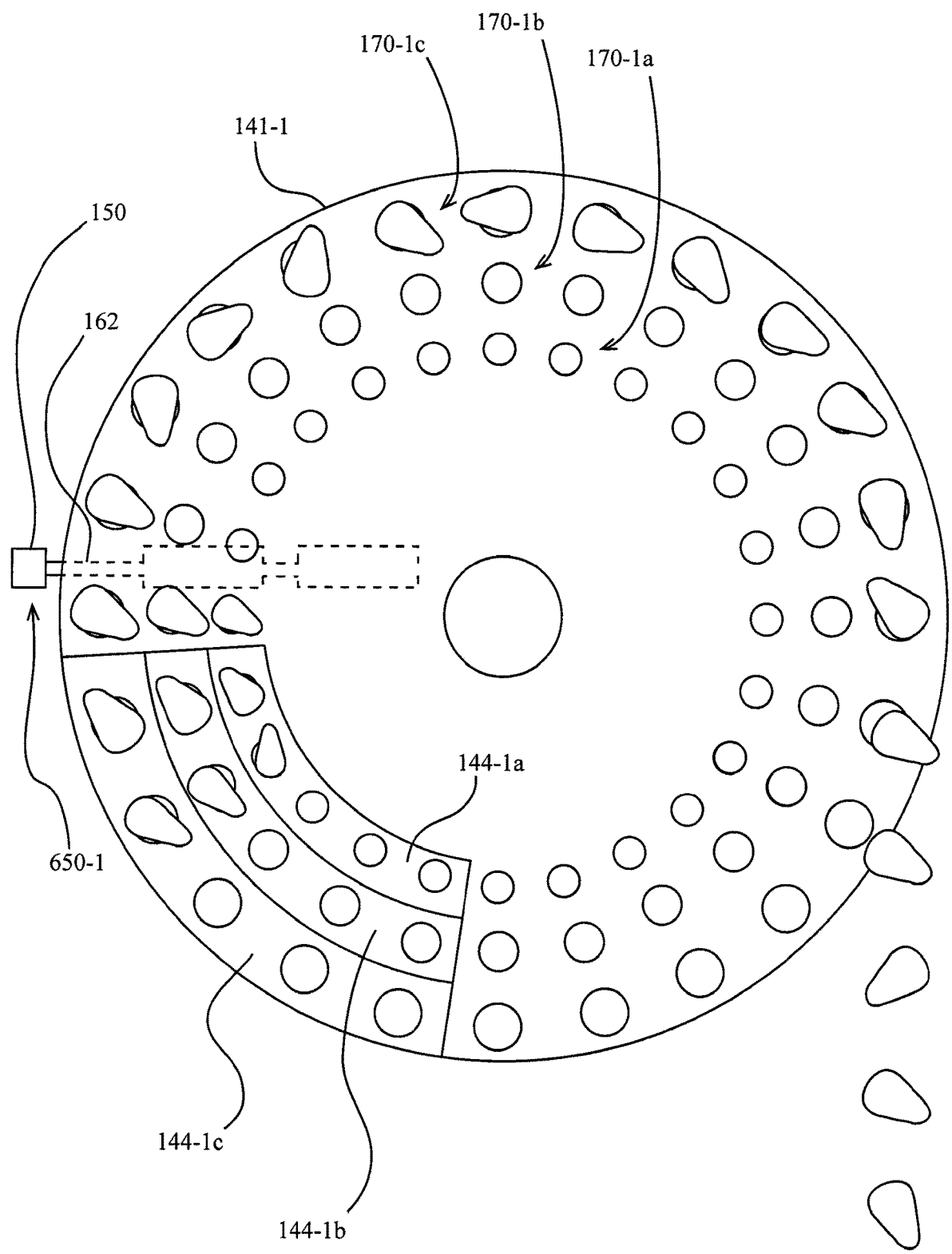
FIG. 11 is a side elevation view of an embodiment of a seed meter including multiple seed pools and a vacuum cutoff roller key.

In the embodiment of FIG. 11, three segregated seed pools 144 are in fluid communication with pneumatic lines 120 for receiving seed from the bulk seed hoppers 110 (e.g., seed pool 144-1c is in fluid communication with pneumatic line 120-1c). Each seed pool 145 is adjacent to and in seed communication with concentrically arranged seed aperture arrays 170 (e.g., the seed pool 144-1c is adjacent to and in seed communication with the seed aperture array 170-1c). An actuator 650 preferably comprises a linear actuator 160 configured to modify a position of a roller key 162. The roller key 162 is preferably configured to selectively cut off the vacuum from two of the three seed aperture arrays 170 such that seeds fall back into the seed pool 145 from which seeds are drawn by the associated aperture arrays 170. As illustrated in FIG. 12, the roller key 162 preferably includes two rollers 164, 168 each having a width 2Ws (where Ws is the transverse width of each seed aperture array 170 as illustrated in FIG. 11) separated by an opening 166 having a width Ws. It should be appreciated that this configuration of the roller key 162 allows positioning of the roller key 162 to selectively cut off vacuum at any two of the three seed aperture arrays 170 while allowing seeds in the other seed aperture array to be transferred and deposited by the disc. For example, in FIG. 11 the roller 164 cuts off vacuum from seed aperture arrays 170-1a and 170-1b allowing seeds to fall back into the seed pools 144-1a and 144-1b, respectively, while seeds are carried by seed aperture array 170-1c and deposited by the disc 141.

Figure 16A:
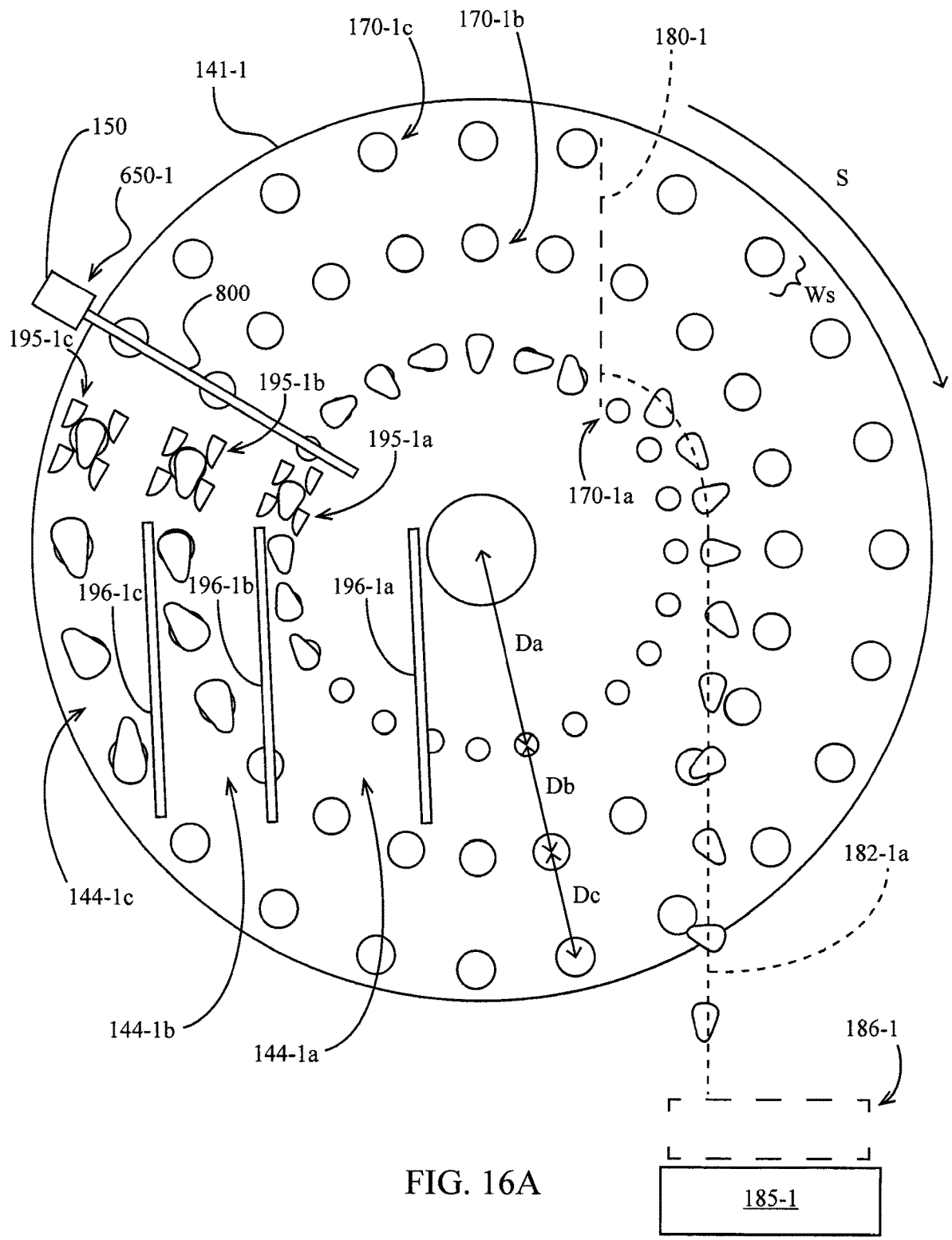
FIG. 16A is a side elevation view of another embodiment of a seed meter including multiple seed pools and a deflector key.
Figure 16B:
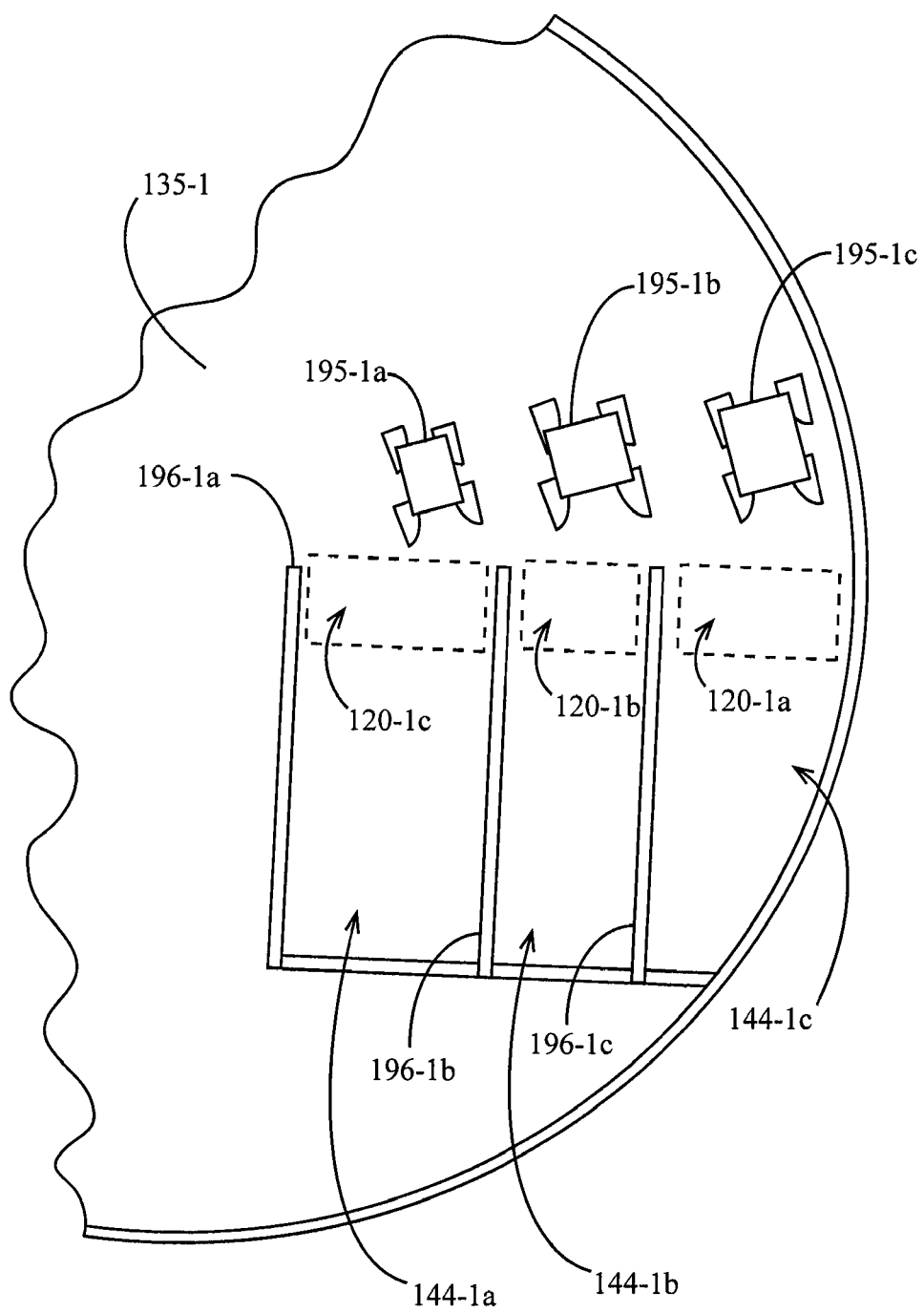
FIG. 16B is an enlarged partial side elevation view of a seed side housing of the seed meter of FIG. 16A.

In the embodiment illustrated in FIGS. 16A and 16B (where 16B is an enlarged partial side elevation view of FIG. 16A), a seed side housing 135 of the seed meter 140 includes three seed pools 145 laterally separated by brushes 196. Each brush 196 is preferably disposed to be in contact with the seed disc 141 when the seed side housing 135 is mounted to the seed meter 140. Each seed pool 145 is preferably in seed communication with an associated pneumatic line 120. As the seed disc 141 rotates in the direction S past the seeds in the seed pools 145, seeds are entrained on the seed aperture arrays 170 and drawn upward out of the seed pools 145. After the seeds exit the seed pools 145, seeds are drawn past the singulators 195; the singulators 195 preferably comprise singulators including multiple co-planar lobes such as those disclosed in Applicant's co-pending International Patent Application No. PCT/US2012/030192, the disclosure of which is hereby incorporated herein in its entirety by reference. The singulators 195 are preferably supported in a spring-loaded fashion by the seed side housing 135 such that the singulator lobes are preferably axially biased against the surface of the seed disc 141. Each singulator 195 is preferably radially biased against an annular shoulder (not shown) provided in the seed disc 141 such that the singulators 195 "float" radially with radial displacement of the seed disc 141. As seeds are drawn past singulators 195, multiple seeds (e.g., doubles or triples) entrained on the seed apertures are stripped from the surface of the disc and fall back into the seed pool 145. It should be appreciated that the singulators 195 are preferably disposed above the associated seed pools such that each seed falls into the seed pool from which it originated after being removed by the singulator 195.

The seed aperture array 170-1a is preferably disposed at a radial distance Da from the axial center of the seed disc 141. The distance Da is preferably approximately six (6) inches. The seed aperture array 170-1b is preferably disposed at a radial distance Da+Db from the axial center of the seed disc 141. The distance Db is preferably between 2 (two) and 3 (three) inches. The seed aperture array 170-1c is preferably disposed at a radial distance Da+Db+Dc from the axial center of the seed disc 141. The distance Dc is preferably between 2 (two) and 3 (three) inches.

Figure 17A:
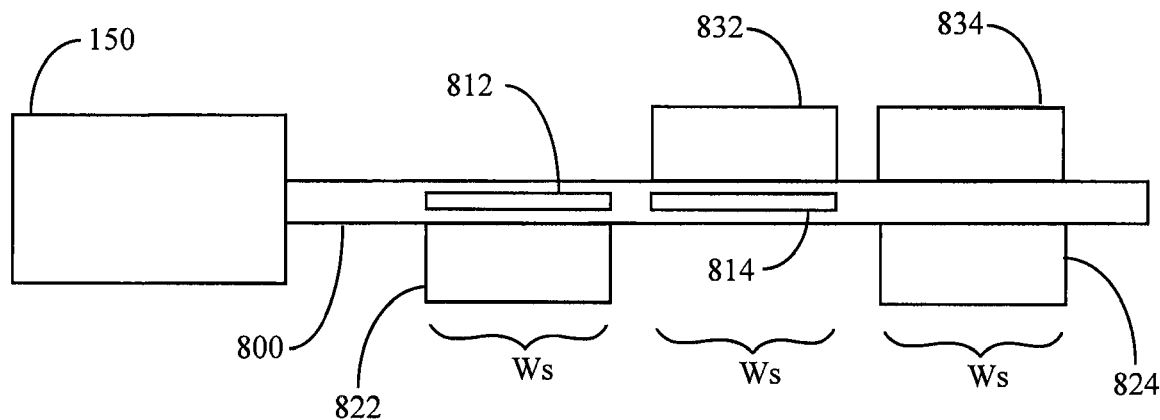
FIG. 17A-17C are orthographic views of the deflector key of FIG. 16A.
Figure 17B:
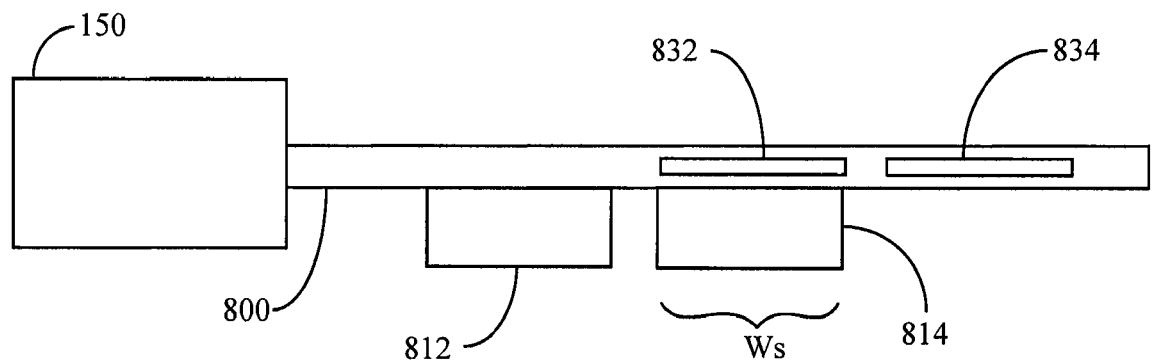
Figure 17C:
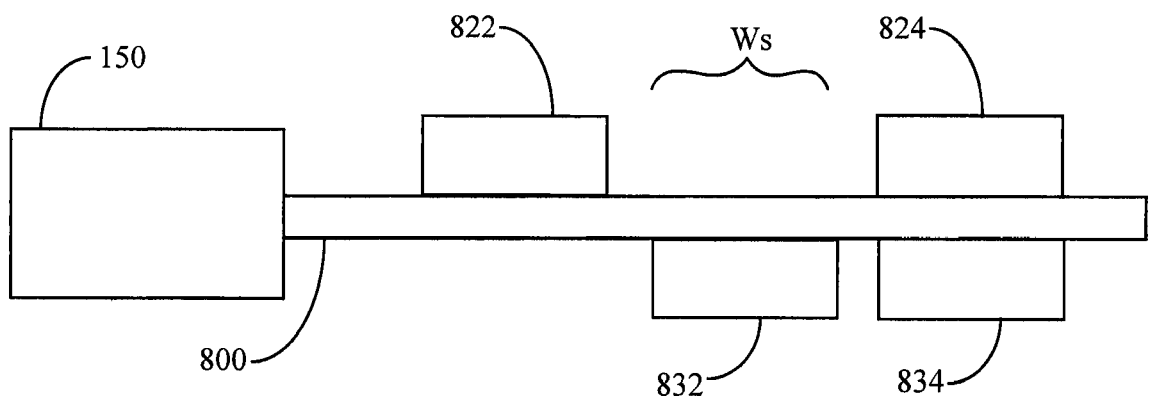

After passing through the singulators 195, seeds are then selectively removed from the seed apertures by a key 800. The key 800 is preferably selectively rotated by a solenoid 150. It should be appreciated that the solenoid 150 comprises an actuator 650 configured to select an active seed pool 145. Referring to FIGS. 17A-17C, the key 800 preferably includes deflectors disposed to selectively deflect seeds from the surface of the seed disc 141. Deflectors 832, 834 are disposed to deflect seeds from the seed aperture arrays 170-1b, 170-1c respectively when the key 800 is oriented such that the deflectors 832, 834 extend toward the seed disc 141, but the key 800 allows seeds on the seed aperture array 170-1a to pass the deflector key 800 undeflected when the key is in that position. As the key 800 is rotated, e.g., in 90 degree intervals, the deflectors 812, 814 and 822, 824 similarly selectively deflect seeds from the surface of the seed disc 141. The solenoid 150 preferably has first, second and third positions in which the key 800 is rotated by increments of 90 degrees. Each deflector preferably has a width Ws at least as wide as the width Ws of the seed apertures on the disc 141 such that seeds are effectively deflected from the apertures by the deflectors; likewise, a gap between the deflectors also preferably has a width Ws such that seeds are allowed to pass between the deflectors. The solenoid preferably rotates between the first, second and third positions based upon the voltage applied to the solenoid; for example, in some embodiments 1 volt corresponds to the first position, 0 volts corresponds to the second position, and −1 volt corresponds to the third position.

After seeds are deflected from the seed disc 141 by the key 800, they preferably fall back into the seed pool 145 from which each seed originated. Thus the key 800 is preferably disposed such that each deflector is positioned vertically above the seed pool 145 corresponding to the seed aperture array 170 drawing seeds from the seed pool to the deflector.

A vacuum seal (not shown) creates a vacuum on the vacuum side of the seed disc 141 (i.e., the reverse side of the seed side of the seed disc illustrated in FIG. 16A) such that seeds are entrained on the seed aperture arrays 170 by the vacuum created on the vacuum side. The vacuum seal preferably creates a vacuum in a region beginning at approximately 7 o'clock (as viewed in FIG. 16A) such that seeds are entrained at the seed pools 145. The vacuum seal preferably terminates along a substantially vertical border 180. The border 180 is preferably between 0 and 3 inches forward of the center of the seed disc 141); in some embodiments the upper end of the border 180 is located between 12 o'clock and 1 o'clock as viewed in FIG. 16A. Because the vacuum seal terminates adjacent a portion of the seed aperture arrays 170 at which the seeds have a forward horizontal velocity, seeds released from the disc 141 after the vacuum seal terminates travel a forward distance while falling from the disc (e.g., along an arcuate path such as path 182 illustrated in FIG. 16A). However, the horizontal velocity of seeds on the seed aperture arrays 170 decreases with the distance of the seed aperture arrays 170 from the center of the disc such that the forward distance traveled by the seeds decrease with the distance of the seed aperture arrays from the disc; e.g., seeds falling from the seed aperture array 170-1c travel a smaller forward distance than seeds released from the seed aperture array 170-1a. Additionally, because seeds on the outer seed aperture arrays 170-1b, 170-1c are released at the same fore-aft position as the inner seed aperture array 170-1a, the width of a fall zone 186 is smaller than if the border 180 was angled forward or extended radially from the center of the seed disc 141. The width of the fall zone 186 is preferably smaller than the width of an opening in the upper end of a seed tube 185 disposed to receive seeds falling from the disc. In other embodiments the vacuum seal terminates along a border that is angled rearwardly such that an upper end of the border is rearward of a lower end of the border; in such embodiments the width of the fall zone 186 is even smaller than that illustrated in FIG. 16A.

In some embodiments, rather than free-falling from the seed disc into the seed tube 185, seeds fall into the flights of a flighted conveyor belt disposed to capture the seeds from any of the aperture arrays and to deposit the seeds captured from the aperture arrays into the seed tube. The flighted conveyor belt may be similar to that described in U.S. Provisional Application No. 61/923,426, incorporated herein in its entirety by reference. In other embodiments, the flighted conveyor belt is configured to deposit seeds directly into the trench. The flighted conveyor belt is preferably driven at a speed directly related to the rotational speed of the seed meter. In some embodiments the flighted conveyor belt is driven by the same motor used to drive the seed disc or driven by a gear driven by rotation of the seed disc. In other embodiments the flighted conveyor belt is driven by a separate motor.

In another embodiment of the system 100, each set of pneumatic lines 120 of the system 100 are in communication with an input switching system and variety switch for switching the variety of seed supplied to the seed meter 140, such as are disclosed in U.S. Provisional Application No. 61/929,665, which is incorporated herein in its entirety by reference.

Variety Selection and Mapping Processes

Figure 14:
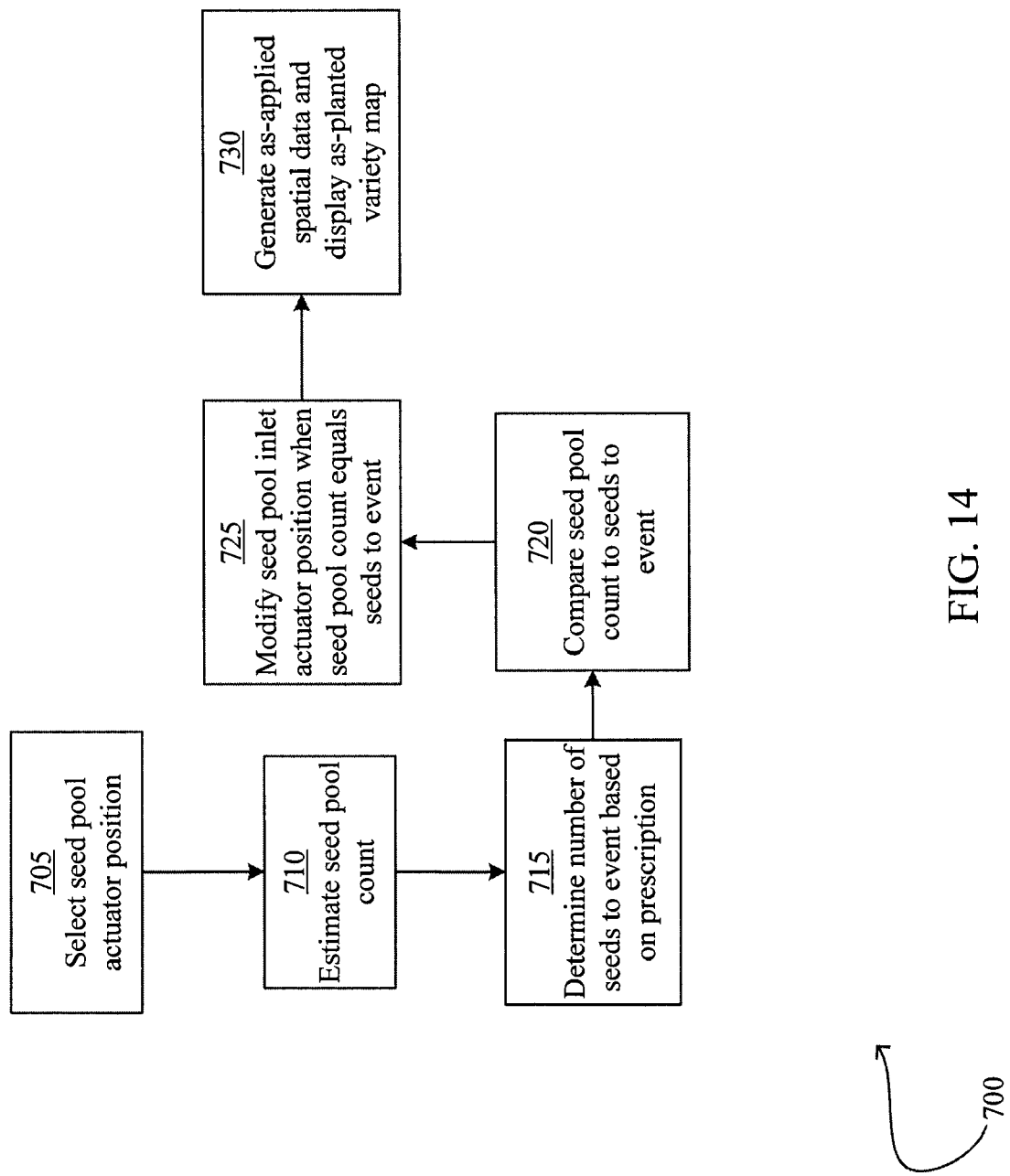
FIG. 14 illustrates an embodiment of a process for implementing and mapping seed variety selections.
Figure 15:
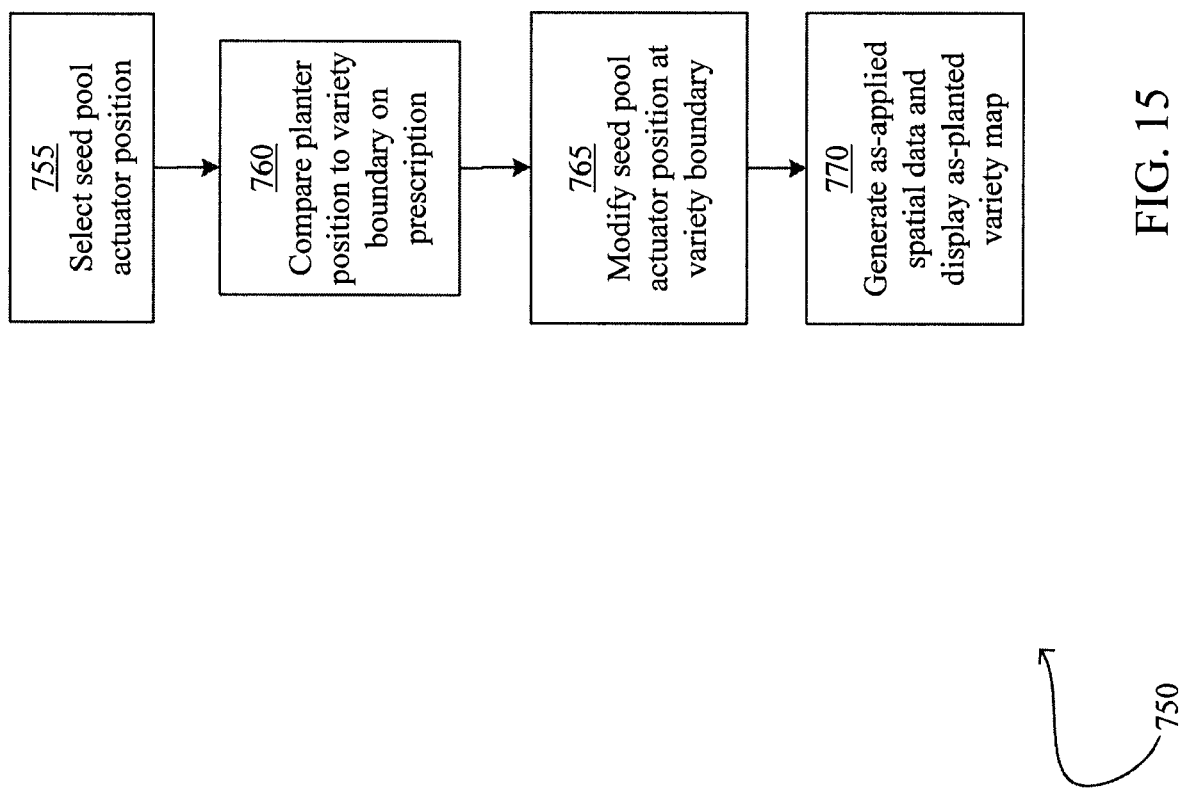
FIG. 15 illustrates another embodiment of a process for implementing and mapping seed variety selections.

A process 700 for selecting and mapping seed varieties is illustrated in FIG. 14. It should be appreciated that the process 700 is adapted for metering apparatus having a central seed pool (e.g., the central seed pool 145-1 in the seed meter 140 of FIG. 5). At step 705, the monitor 610 preferably selects a seed pool actuator position (e.g., extends the actuators 143-1a and 143-1c and retracts the actuator 143-1b to allow seeds from seed pool 144-1b to enter the seed pool 145-1). At step 710, the monitor 610 preferably estimates a seed pool count (e.g., by determining whether the signal generated by the seed pool level sensor 630 corresponds to a nearly empty seed pool). For example, if the seed pool level sensor 630 indicates that light is being received by the seed pool level sensor, the monitor 610 preferably assumes a predetermined number of seeds (e.g., 30 seeds) remain in the seed pool 145. At step 715, the monitor 610 preferably determines the number of seeds to a variety selection event based on a prescription map stored in the memory of the monitor 610, e.g., using the processes disclosed in Applicant's U.S. Provisional Application No. 61/745,315, the disclosure of which is hereby incorporated herein in its entirety by reference. At step 720, the monitor 610 preferably compares the seed pool count to the number of seeds to a variety selection event. At step 725, the monitor 610 preferably modifies a seed pool actuator position when the seed pool count equals the number of seeds to a variety selection event. For example, when the number of seeds to a boundary between a portion of the field to be planted with seeds from bulk seed hopper 110b and 110a is equal to the number of seeds in the seed pool 145-1, the monitor 610 preferably retracts the actuator 143-1a and extends the actuator 143-1b in order to allow seeds from the seed pool 144-1a to enter the seed pool 145-1. At step 730, the monitor 610 preferably generates and displays an as-planted variety map in which distance traveled by the implement during the actuator position modification is indicated by a "blended zone" in which both seeds from bulk seed hoppers 110a and 110b may have been planted.

A process 750 for selecting and mapping seed varieties is illustrated in 15. It should be appreciated that the process 750 is adapted for metering apparatus having multiple seed pools and no central seed pool, such as the seed meter embodiment of FIGS. 7A-7C. At step 755, the monitor 610 selects a seed pool actuator position (e.g., moves the seed pool relative to the disc in the embodiment of FIG. 8 or rotates the servo motor 134 in the embodiments of FIGS. 7A-7C in order to place a different pneumatic line 120 in seed communication with the seed disc 141). At step 760, the monitor 610 compares a position of the implement (as reported by the GPS receiver 666) to a boundary between two varieties on a variety prescription map stored in the memory of the monitor 610. At step 765, the monitor 610 preferably modifies a seed pool actuator position when the implement position crosses a variety boundary on the prescription map. For example, the monitor 610 preferably commands the servo motor 134 to rotate in the embodiments of FIGS. 7A-7C in order to place a different pneumatic line 120 in seed communication with the seed disc 141. At step 770, the monitor 610 preferably generates and displays an as-planted variety map in which the location of the actuator position modification is indicated by a border between seed types stored in bulk seed hoppers 110a and 110b.

Figure 18:
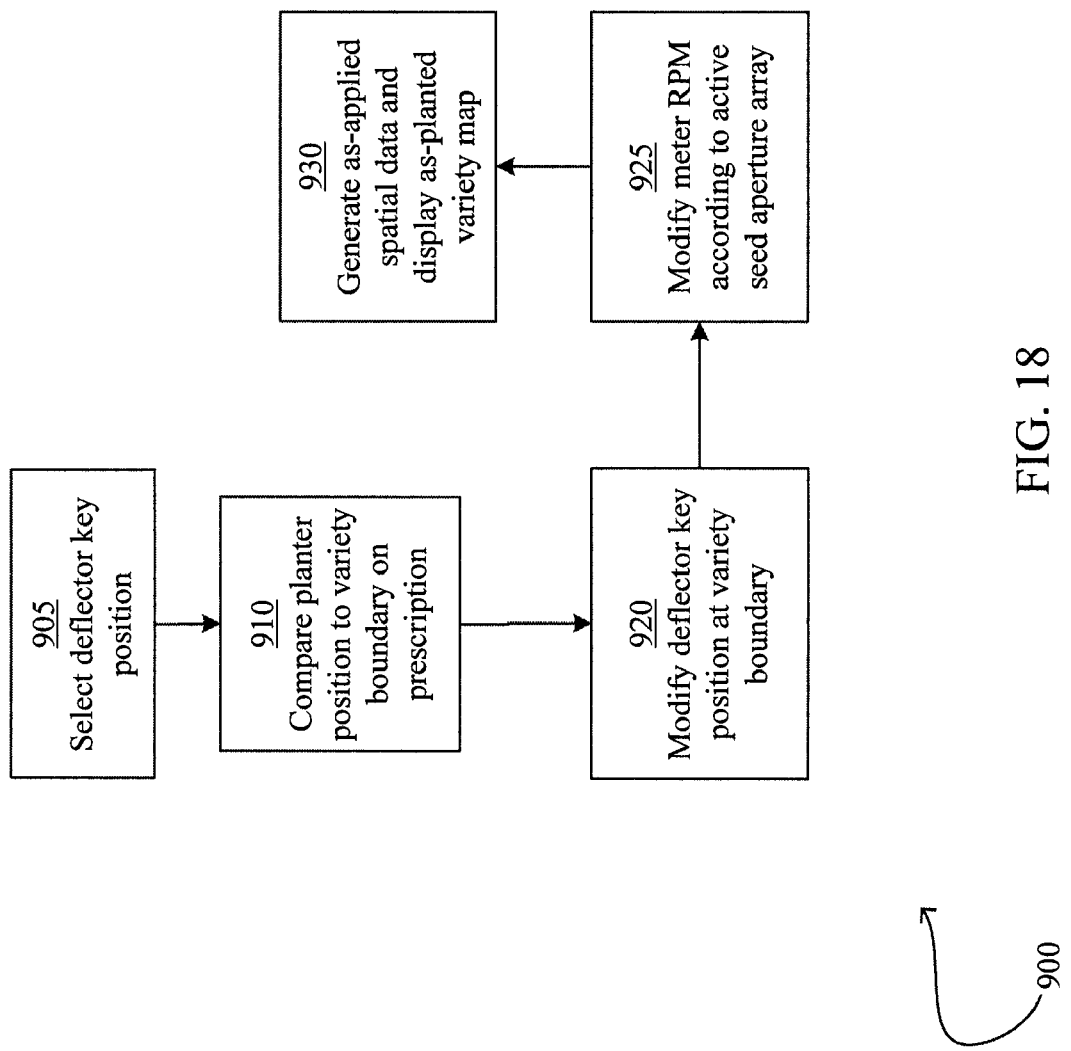
FIG. 18 illustrates another embodiment of a process for implementing and mapping seed variety selections.

A process 900 for selecting and mapping seed varieties is illustrated in FIG. 18. It should be appreciated that the process 900 is adapted for metering apparatus having a multiple seed pools in seed communication with multiple seed arrays from which seeds are selectively deflected from the seed disc by a deflector key, e.g., the embodiments of FIGS. 9 and 11 (and associated embodiments of the keys 152, 162, respectively of FIGS. 10 and 12) or the embodiments of FIGS. 16A-16B (and associated embodiment of the key 800 in FIGS. 17A-17C). At step 905, the monitor 610 preferably selects a first position of the deflector key 800, e.g. by modifying the position of the solenoid 150. The selected position of the deflector key 800 preferably allows one and only one of the three seed aperture arrays 170 (e.g., seed aperture array 170-1a) to carry seeds from the associated seed pool 145 for deposition into the seed tube 185 while the deflectors on the deflector key deflect seeds from the other two seed aperture arrays (e.g., seed aperture arrays 170-1b and 170-1c). At step 910, the monitor 610 preferably compares a position of the planter, e.g., as reported by the GPS receiver 666, to a variety selection boundary on a variety map stored in the memory 614 of the monitor 610. Once a variety selection boundary has been crossed, at step 920 the monitor 610 preferably selects a second position of the deflector key 800, e.g. by modifying the position of the solenoid 150 to rotate the deflector key 800 through 90 degree increments about a longitudinal axis of the deflector key. The selected second position of the deflector key 800 preferably allows one and only one of the three seed aperture arrays 170 (e.g., seed aperture array 170-1b) to carry seeds from the associated seed pool 145 for deposition into the seed tube 185 while the deflectors on the deflector key deflect seeds from the other two seed aperture arrays (e.g., seed aperture arrays 170-1a and 170-1c). At step 925, the monitor 610 preferably commands the seed meter drive 672 to rotate at a new rate R' in revolutions per minute (rpm) corresponding to the desired application rate, the implement speed, and the number of seed apertures in the activated seed aperture array 170. For example, where the deflector key 800 is rotated to deactivate a seed pool array 170-1a having Na seeds and to activate a seed pool array 170-1b having a Nb seeds, assuming a constant desired application rate (e.g. 30,000 seeds per acre) and constant implement speed as reported by the GPS receiver 666 or the speed sensor 668 (e.g., 5 miles per hour), the monitor 610 preferably modifies the rate of seed meter drive rotation R from R to R' according to the equation:

$$R'(\text{rpm}) = R \times \frac{N_b}{N_a}$$

At step 930, the monitor 610 preferably generates spatial data reflecting the as-planted seed variety (e.g., by recording a seed type associated with the seed pools from which the meter 140 allows seeds to be planted prior to and after the variety boundary) and displays an as-applied variety map (e.g., by displaying a map having regions reflecting the seed types planted before and after the variety boundary).

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A system for selecting an agricultural input, comprising: a first input source of a first seed;
   a second input source of a second seed;
   a meter having a seed disc, said meter in communication with said first input source of said first seed and said second input source of said second seed;
   a selection apparatus which constrains said meter to deposit only said first seed or said second seed at one time;
   processing circuitry in electrical communication with said selection apparatus, said processing circuitry configured to send a command signal to said selection apparatus in order to modify a configuration of said selection apparatus from a first configuration to a second configuration, wherein in said first configuration said meter deposits said first seed, and wherein in said second configuration said meter deposits said second seed;
   wherein said selection apparatus includes:
   a first segregated pool of said first seed;
   a second segregated pool of said second seed; and
   a central seed pool in communication with said seed disc;
   a first gate separating said first segregated pool of said first seed from said central seed pool;
   a second gate segregating said second segregated pool of said second seed from said central seed pool;
   a first gate actuator configured to raise and lower said first gate; and a second gate actuator configured to raise and lower said second gate;
   wherein said processing circuitry alternately commands said first and second gate actuators to respectively raise said first gate and said second gate, whereby said seed disc is selectively placed in communication with one of said first and said second segregated pools.

2. The system of claim 1, wherein said first seed pool and said second seed pool are disposed on a conveyor, said conveyor movable between a first position in which said first seed pool is in communication with said seed disc and a second position in which said second seed pool is in communication with said seed disc.

3. The system of claim 1, further comprising:
   a seed level sensor in electrical communication with said processing circuitry.

4. The system of claim 3, wherein said seed level sensor is disposed to generate a signal when an amount of said first or said second seed in said central seed pool is less than a threshold amount.

5. A system for selecting an agricultural input, comprising: a first input source of a first seed;
   a second input source of a second seed;
   a meter in communication with said first input source of said first seed and said second input source of said second seed;
   a selection apparatus whereby said meter is constrained to deposit only said first seed or said second seed at one time, and whereby said meter is capable of alternating between depositing said first seed and said second seed;
   processing circuitry in electrical communication with said selection apparatus, said processing circuitry configured to send a command signal to said selection apparatus in order to modify a configuration of said selection apparatus from a first configuration to a second configuration, wherein in said first configuration said meter deposits said first seed, and wherein in said second configuration said meter deposits said second seed;
   wherein said meter includes a seed disc, said seed disc having a first array of seed apertures and a second array of seed apertures, said second array concentrically arranged with respect to said first array;
   wherein said selection apparatus includes:
   a first seed pool of said first seed, said first seed pool in communication with said first array of seed apertures;
   a second seed pool of said second seed, said second seed pool in communication with said second array of seed apertures; and a key having a first position and a second position, wherein in said first position said key prevents said first seed of said first seed pool in communication with said first array of seed apertures from being deposited, and wherein in said second position said key prevents said second seed of said second seed pool in communication with said second array of seed apertures from being deposited; and an actuator operably connected to said key, said actuator disposed to move said key between said first position and said second position.

6. The system of claim 5, wherein said actuator is in communication with said processing circuitry, said processing circuitry configured to send a control signal to said actuator such that said actuator alternates between said first position and said second position.

7. The system of claim 5, further comprising:

a first singulator disposed to remove excess seeds from said first array of seed apertures; and a second singulator disposed to remove excess seeds from said second array of seed apertures.

8. The system of claim 7, wherein said first singulator is disposed between said first seed pool and said key, and wherein said second singulator is disposed between said second seed pool and said key.

9. The system of claim 7, wherein said key is disposed to knock said first seed from said first array of seed apertures into said first seed pool in said first position, and wherein said key is disposed to knock said second seed from said second array of seed apertures into said second seed pool.

10. The system of claim 5, further including:

a motor for driving said seed disc at variable speeds, said motor in communication with said processing circuitry for receiving a speed command signal corresponding to a rotational speed of said seed disc, wherein said processing circuitry modifies said speed command signal based on a position of said key.

\* \* \* \* \*